United States Patent
Viñes et al.

(10) Patent No.: US 10,549,490 B2
(45) Date of Patent: Feb. 4, 2020

(54) METHOD FOR MANUFACTURING A STIFFENED PANEL MADE FROM COMPOSITE MATERIAL

(71) Applicant: Airbus Defence and Space S.A., Getafe (ES)

(72) Inventors: Pedro Nogueroles Viñes, Getafe (ES); Jose Cuenca Rincón, Getafe (ES); Aquilino Garcia Garcia, Getafe (ES); Bernardo Lopez Romano, Getafe (ES); Maria Mora Mendias, Getafe (ES)

(73) Assignee: AIRBUS DEFENCE AND SPACE S.A., Getafe (ES)

( * ) Notice: Subject to any disclaimer, the term of this patent is extended or adjusted under 35 U.S.C. 154(b) by 242 days.

(21) Appl. No.: 15/427,194

(22) Filed: Feb. 8, 2017

(65) Prior Publication Data

US 2017/0225406 A1 Aug. 10, 2017

(30) Foreign Application Priority Data

Feb. 9, 2016 (EP) ..................................... 16382052

(51) Int. Cl.
*B29C 70/34* (2006.01)
*B29C 70/38* (2006.01)
(Continued)

(52) U.S. Cl.
CPC ............ *B29C 70/34* (2013.01); *B29C 70/386* (2013.01); *B29C 70/54* (2013.01);
(Continued)

(58) Field of Classification Search
CPC ...... B29C 70/386; B29C 70/382; B29C 70/34
See application file for complete search history.

(56) References Cited

U.S. PATENT DOCUMENTS 5,069,737 A 12/1991 Guiton
6,589,472 B1 * 7/2003 Benson ............... B29C 43/3642
264/257

(Continued)

FOREIGN PATENT DOCUMENTS

DE 102009053053 * 5/2011
EP 0373729 6/1990
(Continued)

OTHER PUBLICATIONS

European Search Report, dated Nov. 25, 2016, priority document.

*Primary Examiner* — Anthony Calandra
*Assistant Examiner* — S. Behrooz Ghorishi
(74) *Attorney, Agent, or Firm* — Greer, Burns & Crain, Ltd.

(57) ABSTRACT

A method for manufacturing a stiffened panel made from composite material comprising a skin and elongated reinforcing elements wherein some of the elongated reinforcing elements cross each other. The method comprises the steps of (a) laying up a flat laminate comprising stacked plies of composite layers for forming a structure comprising the elongated reinforcing elements of the panel, (b) cutting the flat laminate along intersection lines of planes defining the webs of two crossing reinforcing elements, (c) cutting in the flat laminate the outline of the elongated reinforcing elements, (d) forming the structure comprising the elongated reinforcing elements of the panel, (e) laying up plies of composite layers for forming the skin, and (f) curing the laid-up plies of the skin and the formed structure comprising the elongated reinforcing elements.

11 Claims, 6 Drawing Sheets

(51) Int. Cl.
  *B29C 70/54* (2006.01)
  *B29K 105/06* (2006.01)
  *B29K 307/04* (2006.01)
  *B29L 9/00* (2006.01)
  *B29L 31/30* (2006.01)

(52) U.S. Cl.
  CPC ...... *B29K 2105/06* (2013.01); *B29K 2307/04* (2013.01); *B29K 2995/0082* (2013.01); *B29L 2009/00* (2013.01); *B29L 2031/3082* (2013.01); *B29L 2031/3085* (2013.01)

(56) References Cited

U.S. PATENT DOCUMENTS

| | | | |
|---|---|---|---|
| 2003/0068472 A1 | 4/2003 | Benson et al. | |
| 2011/0315824 A1* | 12/2011 | Pook | B29C 70/443 244/133 |
| 2014/0079903 A1* | 3/2014 | Hugon | B29C 65/5057 428/105 |
| 2016/0297167 A1* | 10/2016 | Crawford, III | B32B 3/266 |

FOREIGN PATENT DOCUMENTS

| | | |
|---|---|---|
| WO | 03031165 | 4/2003 |
| WO | 2014200393 | 12/2014 |

* cited by examiner

FIG. 7

METHOD FOR MANUFACTURING A STIFFENED PANEL MADE FROM COMPOSITE MATERIAL

CROSS-REFERENCES TO RELATED APPLICATIONS

This application claims the benefit of the European patent application No. 16382052.5 filed on Feb. 9, 2016, the entire disclosures of which are incorporated herein by way of reference.

FIELD OF THE INVENTION

The present invention refers to a method for manufacturing integral monolithic structures made from composite material. More specifically, the invention refers to the manufacture of the so-called stiffened panels made from composite material including a skin and a series of elongated reinforcing elements, for instance, stringers, beams or frames, which are fixed onto a face of the skin.

The invention is intended to be applied in the field of aeronautics, in particular, but not exclusively, for fuselage panels but also for wing and tail panels and other applications.

BACKGROUND OF THE INVENTION

Currently, panels of carbon fiber reinforced polymers (CFRP) are stiffened with longitudinal reinforcing elements of different shapes, for example T, L, U or omega, manufactured by co-cured or co-bonded processes. Then, transversal reinforcing elements are assembled by rivets.

More specifically, the skin could be automatically laid up using, for instance, Automated Tape Laying (ATL) or Automated Fiber Placement (AFP) and every stringer could also be automatically laid up. This process has the drawback that one or two laminates are needed to get every longitudinal reinforcing element, increasing recurring costs and lead time.

Afterwards laminates are trimmed to a final longitudinal reinforcing element shape and every longitudinal reinforcing element is individually hot formed by using press forming machines and then the integration of the longitudinal reinforcing elements with the skin has to be performed. In a co-curing process, the integration operation may consist of locating the longitudinal reinforcing elements, for instance stringers, and the skin in a tool and additionally introducing a system for pressurizing the interior of the stringer in case of having a closed shape longitudinal reinforcing element. For a co-bonding process, a curing cycle of the stringers is performed previous to the step of locating the stringers into the tool. Another possibility would be firstly curing the skin and afterwards integrating the stringers.

Finally, the skin and stringers assembly is bagged and a curing cycle is applied. At the end, stringers and skin are demolded. Finally, the frames that are previously cured are assembled to the skin and stringers structure by rivets.

Additionally, crosses between longitudinal and transversal reinforcing elements are made such that only one of the two elements is maintained continuous. This implies that both elements shall be thereafter joined in the crossing zones by a plurality of connecting elements (riveted or bonded), resulting in high weight penalties and/or high production and assembly costs and also debonding risks when using connecting elements bonded to the beams and frames.

In composites, especially in the aeronautical industry, it is necessary to develop new concepts based in high strain and stiffness-weigh ratios. For this purpose, low thickness skins with stringers in different sections like "T", "L" or "omega" are developed.

On the other hand, innovative skins concepts to be developed shall provide a cost saving compared with current configurations. For this purpose, manufacture of co-cured/co-bonded parts is very interesting as it decreases cured cycles and labor hours in assembly, due to removal of riveting. However, it is a challenge to solve the composites core with efficient stiffness and easy manufacturing.

SUMMARY OF THE INVENTION

The present invention proposes the manufacturing of stiffened panels having elongated reinforcing elements comprising a web, and usually a head joined to the web, in which some of the elongated reinforcing elements cross each other, for instance, because they are located both in longitudinal and transversal directions.

To be able to achieve this panel, it is necessary to improve deformability of the crosses of the pre-preg elongated reinforcing elements during the forming cycle.

It is therefore a first object of the present invention to provide a method that comprises the following steps:

a.) laying up a flat laminate comprising stacked plies of composite layers for forming a structure comprising the elongated reinforcing elements of the panel, b.) cutting the flat laminate along the intersection lines of the planes defining the webs of two crossing reinforcing members such that when forming the flat laminate, the laminate will spread out through the intersections, c.) cutting in the flat laminate the outline of the elongated reinforcing elements in their position on the panel, d.) providing the flat laminate previously generated over a tooling base for forming the structure comprising the elongated reinforcing elements of the panel, e.) applying a forming process to the structure comprising the elongated reinforcing elements of the panel, f.) laying up plies of composite layers for forming the skin, g.) providing the laid-up plies of the skin and the formed structure comprising the elongated reinforcing elements of the panel on a tool for their integration by curing, h.) integrating together by curing the skin and the formed structure comprising the elongated reinforcing elements, i.) obtaining a cured panel made of a skin and elongated reinforcing elements in which some of the elongated reinforcing elements cross each other.

Therefore, firstly a single flat laminate is laid up which comprises all the reinforcing elements of the panel, for instance longitudinal and transversal reinforcing elements, and which has to get the shape of the crosses of the reinforcing elements after the forming cycle. Additionally, some cuts in the corners of the crosses of the reinforcing elements are performed to acquire enough deformability and to allow the flat laminate to adjust to this geometry. Corners mean, for this application, the intersection of the planes of the webs of two crossing reinforcing elements. More specifically, the invention develops a pre-preg stringer cross with strategic tape cuts in its corners so as to improve deformability of the composite material during the forming process.

Secondly, the skin is also laid up, for instance, using ATL or FP as the actual processes.

One of the advantages of the method is that the reinforcing elements, for instance, stringers and frames, are integrated in one single laminate creating the structure comprising the elongated reinforcing elements, so it is only necessary to lay up one laminate instead of several laminates, which increases the speed of machining because it is easier to lay up one bigger laminate. In addition to this, there is only one laminate instead of several laminates which reduce recurring costs and lead time (more speed is achieved and fewer step machines for having fewer laminates).

A further advantage is that only one hot forming process is required when the reinforcing element structure is preformed.

The invention has the following additional advantages:
High quality, repeatability and reproducibility in the shape of the crossing stringers.
High level automation of the manufacturing process.
Reduction of recurring costs (RC) from the reduction of curing cycles, forming process, manufacturing of transversal reinforcing elements, cutting longitudinal elements and the reduction of labor hours due to avoidance of riveting during assembly operations.

Afterwards, the integration of the skin and the structure comprising the reinforcing members is performed by placing the structure and the laid-up skin in a tool for integrating both parts by curing.

Regarding step g) longitudinal cores are provided into the cavities between the elongated reinforcing members and the skin. Due to the crosses between reinforcing elements in the panel, some of the cores are kept continuous while some others are divided into several parts which extend between the continuous cores.

It is an additional object of the invention, independently of the previously described method for manufacturing a stiffened panel comprising cuts in the corners, a method for co-curing or co-bonding the skin and an elongated reinforcing element wherein the reinforcing element comprises a closed shape, which means that closed channels are formed between the reinforcing element and the skin. This method for co-curing or co-bonding is specially intended for curved reinforcing elements.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
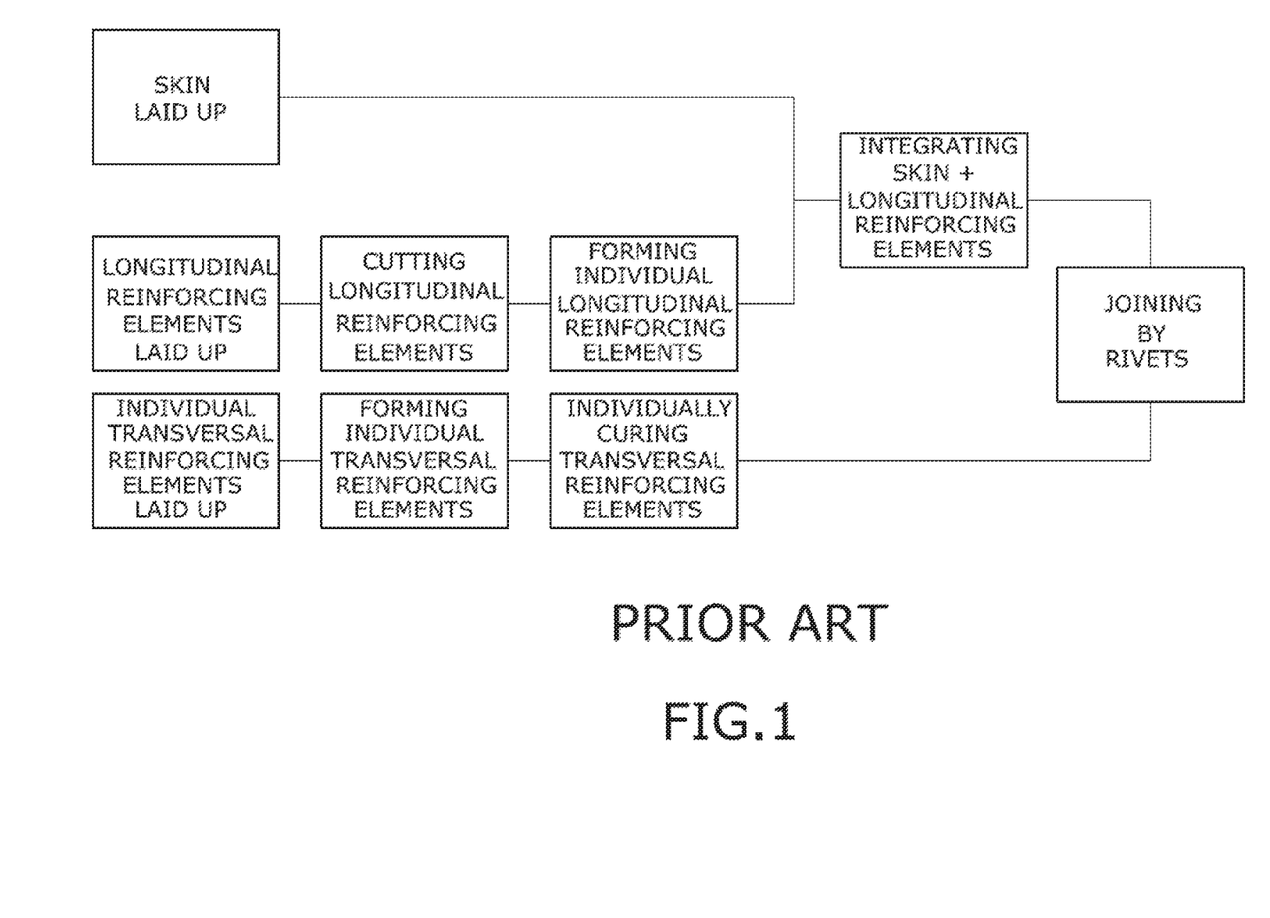
FIG. 1 shows a flow chart of the manufacturing process of a stiffened panel known in the prior art.
Figure 2:
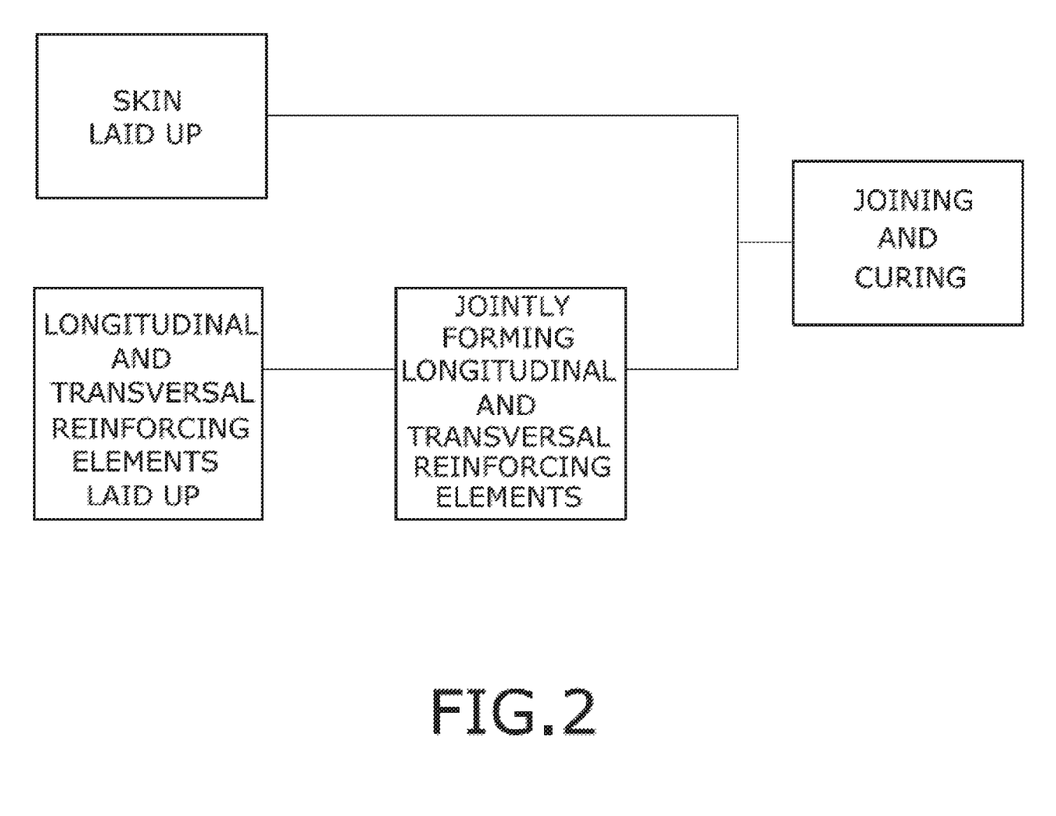
FIG. 2 shows an embodiment of the manufacturing process of a stiffened panel according to the invention.

FIG. 1 shows a known process for manufacturing a stiffened panel and FIG. 2 shows an embodiment of the claimed process.

Figure 3:
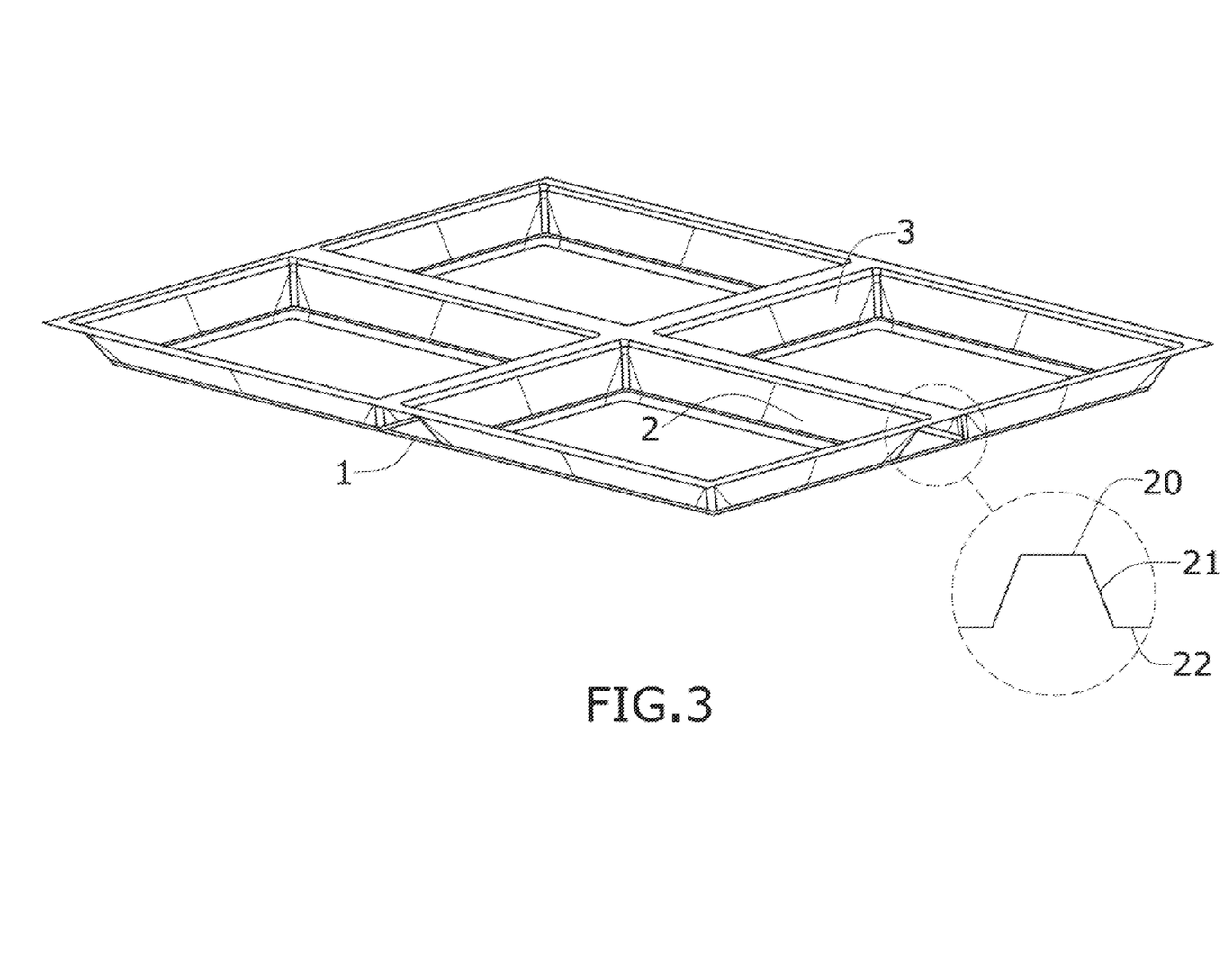
FIG. 3 shows a perspective view of an embodiment of a stiffened panel according to the invention.

FIG. 3 shows a perspective view of an embodiment of a stiffened panel comprising a skin (1) and elongated reinforcing elements (2, 3), particularly longitudinal and transversal straight omega stringers (2, 3) although other configurations would be possible, such as curved beams or frames crossing with stringers at an angle different than 90°.

The stringers (2, 3) have a closed shape cross section (omega Ω-shaped or even variants thereof) with a head (20), two webs (21) and two opposite longitudinal flanges (22) which are fixed onto a face of the skin (1).

In the shown embodiment, both the stringer (2, 3) laminate and the skin (1) laminate are made of pre-preg. Both flat laminates are manufactured by an Automated Tape Layup (ATL) machine.

Figure 4:
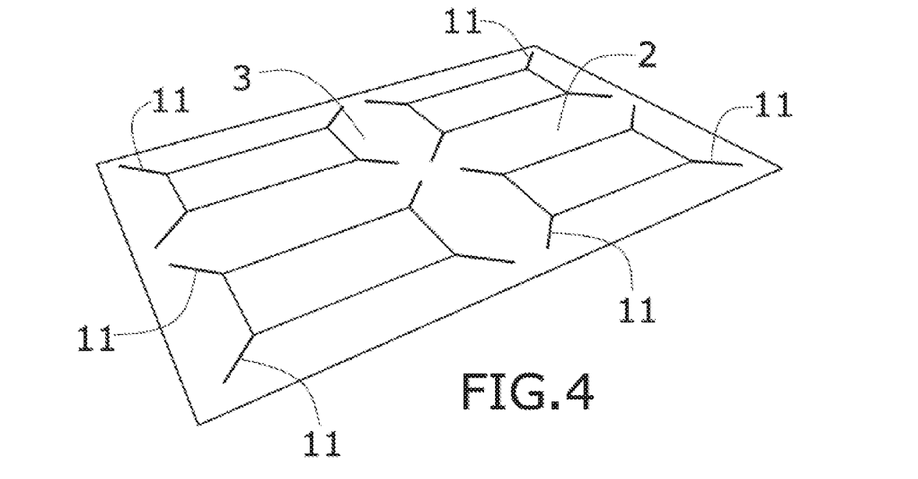
FIG. 4 shows a perspective view of a flat laminate of the structure comprising the elongated reinforcing elements of the panel according to FIG. 3.

Regarding the stringers (2, 3), the result of the two first steps of the claimed method is depicted in FIG. 4 that discloses the laid-up flat laminate comprising stacked plies of composite layers for forming the structure comprising the elongated reinforcing elements (2, 3) or stringers of the panel such that the whole reinforcing structure of the panel is performed in one laminate. The outline of the stringer (2, 3) structure is cut, for instance, with a numerical program using the ATL machine such that the stringers (2, 3) have nearly their net shape extended on a plane as it is disclosed in FIG. 4.

Different configurations are possible for laying up the plies of the flat laminate of the elongated reinforcing elements (2, 3) of the panel. One configuration could be a laminate having only some of the directions of laid up plies, for instance in a Cartesian Coordinate System, 45° and −45° directions, or another possibility would be a laminate having plies in all the main directions (0°, 45°, 90°, −45°). A laminate having directions 0° and 90° will be more difficult to manufacture since the deformability of the fibers along the corner between crossing stringers (2, 3) is complicated because the crosses are located in 45° and −45°.

To solve this drawback, the present method comprises a step in which the plies are cut (11) in the corners, i.e., along the intersection line of the planes defined by the webs (21) and the two flanges (22) attached to the webs (21) of two crossing reinforcing elements (2, 3). Hence, this allows the flat laminate to open and adapt to the required geometry of the stringers (2, 3) during the forming process.

Figure 5:
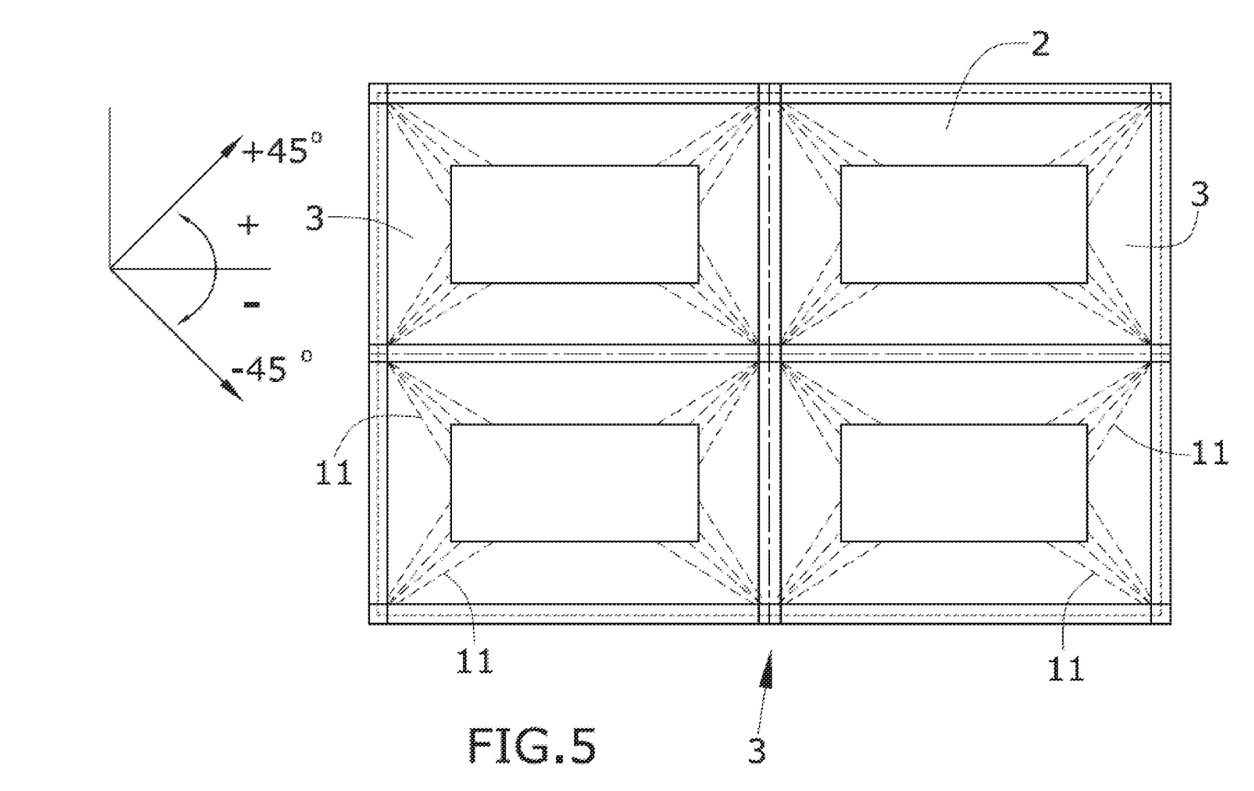
FIG. 5 shows a plan view of a schematic representation of the flat laminate according to FIG. 4 showing an embodiment with cuts at the corners of the crosses of the reinforcing elements.

Although each ply may be cut in the same line defined by the intersections of the planes of the webs (21), it is preferred to cut each ply of the flat laminate in a different position, so that they are not coincident as shown in FIG. 5, allowing the laminate to spread out and adapt to the geometry. With this strategy, gaps or holes in the corners are avoided. Cuts (11) not coincident, allow continuity for the stress, high stiffness and stiffness-weight ratio, which were expected, preventing liquids from entering inside.

Additionally, the cuts (11) could be out of phase with the intersection line, for instance, between 5° and 10°. Furthermore, in the disclosed embodiment the cuts (11) have a common vertex close to the head (20) to avoid having cuts (11) far from the corner.

Moreover, in an additional embodiment, not all the plies are cut but only the plies which do not allow the deformability, i.e., plies whose direction is not the same as the corner, due to plies having the direction of the corner, i.e., of the intersection line of the planes having the two webs (21), do not have problems to spread out. For example, in −45° corners, it is only needed to cut the plies of +45°, 0° and 90° directions because fibers of −45° directions can extend easily and do not need cuts (11). Applying the same theory in a +45° corner, it is only needed to cut the plies of −45°, 0° and 90° directions. Notwithstanding the previous described embodiment, also plies having a small deviation, i.e., which are nearly coincident with the direction of the corner could be formed without being cut.

Afterwards, a hot forming process is applied to the structure comprising the stringers (2, 3) of the panel. The laminate of the reinforcing element (2, 3) structure is located on a hot forming tool and is fixed with a caul plate and screws, then the tool with the laminate is placed in a forming device. The system is closed to apply the forming cycle and get the final shape of the stringer (2, 3) structure.

For this particular embodiment, a male/female part of the tooling of the longitudinal and transversal (2, 3) elements have a cross-section of trapezium shape.

Figure 6:
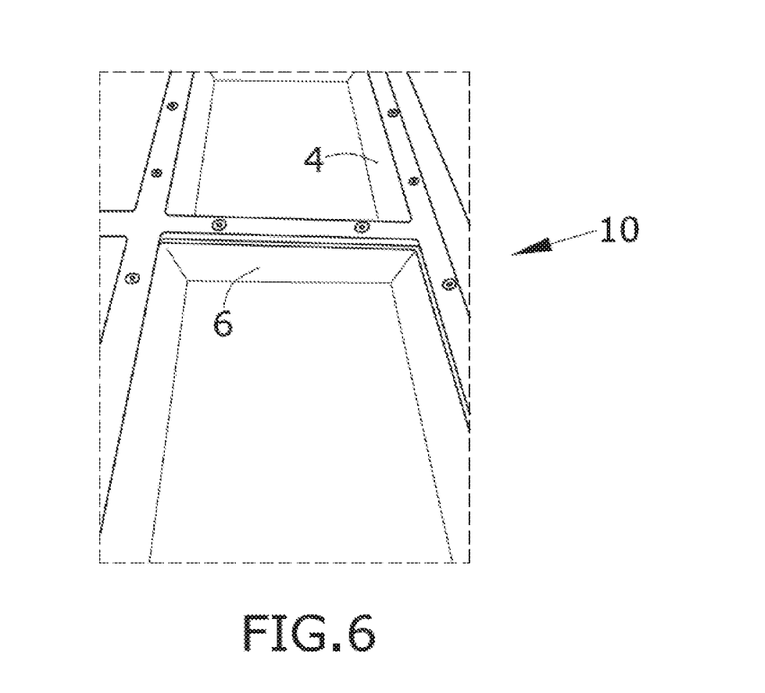
FIG. 6 shows a perspective view of an embodiment of a molding tool for forming the structure comprising the elongated reinforcing elements of the panel.

FIG. 6 shows a perspective view of the female part of a molding tool, comprising a molding female base (10) comprising longitudinal and transversal protuberances (4, 6) having the cross-section of the longitudinal and transversal elements (2, 3) to be formed.

One of the advantages of this process is that only one hot-forming machine is required for forming the longitudinal and transversal reinforcing elements (2, 3). Lead time and recurring costs will be reduced because the gaps in the actual process can be erased, it isn't needed to preform stringer and frames individually, which clearly influences the hourly rate.

Afterwards, a curing or bonding cycle is applied to get the integration of the skin (1) and the stringer (2, 3) structure.

The integration tool could be a curing tool and the skin (1) and the formed structure comprising the elongated reinforcing elements (2, 3) would be co-cured or, as an alternative, the skin (1) or the formed structure comprising the elongated reinforcing elements (2, 3) could be independently cured, the other part being uncured, and afterwards both the skin (1) and the formed structure comprising the elongated reinforcing elements (2, 3) would be provided on a co-bonding tool such that they are co-bonded together.

During a curing process, firstly the stringer (2, 3) structure is located in the curing tool, afterwards cores (8, 9) with the cross-sectional shape of the stringers (2, 3) are located into the cavities between the stringers (2, 3) and the skin (1), then the rowing and the rowing support tape are positioned and finally the skin (1) is located over the stringer (2, 3) structure. Some of the cores (8, 9) will be continuous, i.e., will have the length of the stringer (2, 3) but some others will be discontinuous as they will cross with the continuous cores (8, 9).

For demolding the cured panel, it is necessary to join the discontinuous cores (8, 9) between them to facilitate their extraction and to avoid the cores (8, 9) from getting stuck in the crosses of the stringers (2, 3). This joint could be available at the extremes of the cores (8, 9) to simplify pulling them out. Using a metal band to join the different parts in which a discontinuous core (8, 9) is divided, should be adequate.

For flat panels, the previous solution should be sufficient to perform the demolding process, but for curved panels it is necessary to improve the curing tool to be able to demold the cores (8, 9) when there are several crosses. The main problem is in using solid cores (9) because it is necessary to have some flexibility to be able to demold the cores (8, 9). For this reason, it is required to be a flexible core.

In addition to this, the size of the cores (8, 9) is important to be able to demold the cores (8, 9), especially in the direction of the curvature.

It is therefore another object of the invention, which is independent from the manufacturing process which has been previously described, a method for co-curing or co-bonding a skin (1) and at least a reinforcing element (2, 3) having a closed shape which comprises the following steps:

providing a formed elongated reinforcing element (2, 3), providing one hollow inflatable core (8) having the shape of a first part of the cross-sectional shape of the elongated reinforcing element (2, 3), providing one solid core (9) having the shape of a second part of the cross-sectional shape of the elongated reinforcing element (2, 3) not covered by the hollow inflatable core (8) such that the solid core (9) and the hollow inflatable core (8) both cover the entire cross-sectional shape of the elongated reinforcing member (2, 3), inserting a vacuum bag inside the hollow inflatable core (8), applying pressure in the vacuum bag such that it forces the hollow inflatable core (8).

Therefore, the additional invention provides a combination of a solid core (9), for instance made of silicone, and a hollow inflatable core (8) which are placed into the cavity defined by the skin (1) and the stringer (2, 3) as part of the tool. With this method, not only the demolding process is improved, but also the compaction during the curing or bonding cycle improves because a tubular vacuum bag is used in the hollow inflatable cores (8).

Inflatable cores (8) provide the advantage that their section can be reduced to pull them out firstly. This creates enough space to pull out the solid cores (9) in curved panels. Inflatable cores (8) pressurize and act with the solid cores (9) during the curing cycle and besides they are responsible of the demolding of the part.

The position of the hollow inflatable cores (8) will allow the demolding according the direction of the curvature of the reinforcing element (2, 3). For example, the solid cores (9) should be located above the hollow inflatable cores (8) in the curvature direction to allow the solid cores (9) drop when the hollow inflatable core (8) is pulled out and to have more space, necessary for the curvature. In the other direction, where there is less curvature, solid cores (9) can be located below the hollow inflatable cores (8) because solid cores (9) can be pulled out easily for not having curvature and positioning the metal band to join them.

Figure 7:
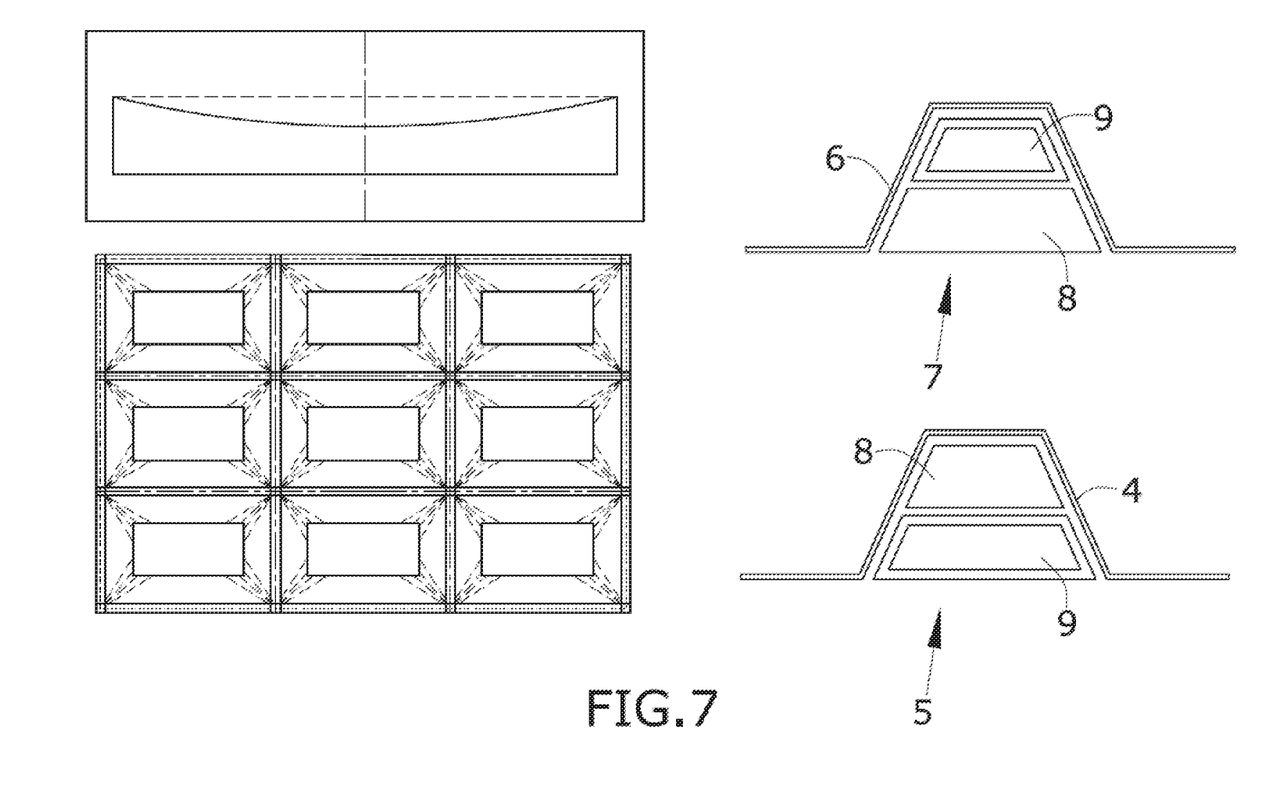
FIG. 7 shows a cross-section of the cores inserted in the cavities between the elongated reinforcing elements and the skin.

More particularly and regarding the panel having crossing reinforcing elements (2, 3), FIG. 7 discloses that the longitudinal cavities (7) between the elements (2, 3) and the skin (1) comprise a lower solid core (9) and an upper inflatable core (8) and that the transversal cavities (7) comprise an upper solid core (9) and a lower inflatable core (8).

During the integration process of the panel object of the embodiment of the invention, an accurate sequence of assembly is required to put all the elements in the right position and be able to perform the demolding operations.

A first step comprises placing the inflatable cores (8) in the transversal position, which have the total length. Then, several solid cores (9) are located in the longitudinal position. These solid cores (9) are separated to allow the inflatable cores (8) go through, but they have a metal band to join them and to be able to demold them.

A second step comprises placing the inflatable cores (8) in the longitudinal position over the inner solid cores (9) positioned in the first step, which have the total length. Then, several inner solid cores (9) are located in the transversal position over the inflatable cores (8) positioned in the first step. These inner solid cores (8) are also separated to allow the inflatable cores go through, but they have a metal band to join them and to be able to demold them, too.

The next step is the preparation of a vacuum bag to cure the panel and applying a curing cycle to get the cured panel.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a stiffened panel made from composite material comprising a skin and elongated reinforcing elements located on the skin, said elongated reinforcing elements comprising at least a web and wherein some of the elongated reinforcing elements cross each other, the method comprising the following steps:
    a.) laying up a flat laminate comprising stacked plies of composite layers for forming a structure comprising the elongated reinforcing elements of the stiffened panel,
    b.) cutting the flat laminate along intersection lines of planes defining the webs of two crossing elongated reinforcing elements,
    c.) cutting in said flat laminate an outline of the elongated reinforcing elements in their position in the stiffened panel,
    d.) providing the flat laminate, previously generated, over a tooling base for forming the structure comprising the elongated reinforcing elements of the stiffened panel,
    e.) applying a forming process for forming the elongated reinforcing elements structure,
    f.) laying up plies of composite layers for forming the skin,
    g.) providing the laid-up plies of the skin and the formed structure, comprising the elongated reinforcing elements of the stiffened panel, on an integrating tool by curing,
    h.) integrating together, with the integrating tool, the skin and the formed structure, comprising the elongated reinforcing elements, by curing,
    i.) obtaining a cured panel made of skin and elongated reinforcing elements in which some of the elongated reinforcing elements cross each other,
    wherein during the cutting step at the intersections of the planes defining the webs of two crossing elongated reinforcing elements, the cuts are performed in each ply in a different position so that the cuts are not coincident,
    wherein plies of the flat laminate each exhibit a plying direction in a Cartesian Coordinates System,
    wherein the flat laminate incorporates a ply having a unique plying direction relative to another ply,
    wherein the ply having a unique plying direction relative to another ply has a plying direction which is coincident or nearly coincident with a direction of the intersection line of the planes defining the webs of two crossing elongated reinforcing elements, does not have cuts in the plying direction.

2. The method for manufacturing a stiffened panel made from composite material, according to claim 1, wherein the integrating tool is a curing tool and the skin and the formed structure comprising the elongated reinforcing elements are co-cured.

3. The method for manufacturing a stiffened panel made from composite material, according to claim 1, wherein one of the skin or the formed structure comprising the elongated reinforcing elements is independently cured while the other of the skin or the formed structure is uncured and afterwards both the skin and the formed structure comprising the elongated reinforcing elements are provided on a co-bonding tool such that they are co-bonded together.

4. The method for manufacturing a stiffened panel made from composite material, according to claim 1, wherein the elongated reinforcing elements are longitudinal and transversal reinforcing elements.

5. The method for manufacturing a stiffened panel made from composite material, according to claim 1, wherein the cuts are out of phase with respect to the intersection line.

6. The method for manufacturing a stiffened panel made from composite material, according to claim 1, wherein the tool for integrating together the skin and the formed structure comprising the elongated reinforcing elements comprises longitudinal cores with the cross-sectional shape of the elongated reinforcing elements which are provided into the cavities between the elongated reinforcing members and the skin.

7. The method for manufacturing a stiffened panel made from composite material, according to claim 6, wherein some of the cores are continuous and some of the cores are divided into several parts that extend between the continuous cores.

8. The method for manufacturing a stiffened panel made from composite material, according to claim 7, wherein the parts in which the discontinuous cores are divided are joined among them to allow their extraction by pulling from one of the cores located in the edge of the panel.

9. The method for manufacturing a stiffened panel made from composite material, according to claim 6, comprising the following steps for providing the laid-up plies of the skin and the formed structure comprising the elongated reinforcing elements of the panel on the integration tool,
    providing the structure of elongated reinforcing elements,
    providing a hollow inflatable core having the shape of a first part of the cross-sectional shape of the elongated reinforcing elements into the cavities of the elongated reinforcing elements,
    providing a solid core having the shape of a second part of the cross-sectional shape of the elongated reinforcing element not covered by the hollow inflatable core such that the solid core and the hollow inflatable core cover the entire cross-sectional shape of the elongated reinforcing element,
    providing the laid-up plies of the skin onto the structure of the elongated reinforcing elements,
    inserting a vacuum bag inside the hollow inflatable core,
    applying pressure in the vacuum bag such that the vacuum bag presses against the hollow inflatable core.

10. The method for manufacturing a stiffened panel made from composite material, according to claim 9, further comprising a step of demolding the cured stiffened panel in which the hollow inflatable cores are reduced to pull them out firstly and afterwards the pulling out of the solid cores is performed.

11. The method for manufacturing a stiffened panel made from composite material, according to claim 1, wherein cuts is in successive plies have a common vertex close to the head joining adjacent webs.

* * * * *